United States Patent [19]

Jenkner

[11] Patent Number: 4,879,931
[45] Date of Patent: Nov. 14, 1989

[54] METHOD FOR TRANSPORTING AWAY PANEL SECTIONS CUT OFF A WORKPIECE PANEL ALONG A CUTTING PLANE IN A PANEL SAW

[76] Inventor: Erwin Jenkner, Lindenstrasse 13, Gechingen, Fed. Rep. of Germany

[21] Appl. No.: 147,452

[22] Filed: Jan. 25, 1988

[30] Foreign Application Priority Data

Jan. 26, 1987 [DE] Fed. Rep. of Germany ....... 3702174

[51] Int. Cl.$^4$ ............................................. B26D 7/06
[52] U.S. Cl. ......................................... 83/23; 83/110; 83/152; 83/161; 83/452; 414/744.2; 414/752
[58] Field of Search ...................... 83/23, 26, 110, 151, 83/152, 154, 155, 161, 452; 414/744 B, 752; 198/468.2, 468.4, 457

[56] References Cited

U.S. PATENT DOCUMENTS

| | | | |
|---|---|---|---|
| 3,406,837 | 10/1968 | Kirsch et al. | 414/744 B |
| 3,769,864 | 11/1973 | Morse et al. | 83/110 |
| 3,860,125 | 1/1975 | Johnson et al. | 414/744 B |
| 4,082,261 | 4/1978 | Johannisson et al. | 83/152 |
| 4,242,025 | 12/1980 | Thibault | 414/752 |
| 4,275,627 | 6/1981 | Anderson et al. | 83/152 |
| 4,406,197 | 9/1983 | Barderhagen et al. | 83/152 |
| 4,544,824 | 10/1985 | Krutsson | 83/152 |
| 4,619,173 | 10/1986 | Göransson | 83/152 |

*Primary Examiner*—Frank T. Yost
*Assistant Examiner*—Scott A. Smith
*Attorney, Agent, or Firm*—Dick and Harris

[57] ABSTRACT

A method for transporting panel sections away from a panel saw, and an apparatus for accomplishing same. Each panel section is lifted clear of the vicinity of the panel saw after being cut off from a workpiece panel and deposited on a conveyor for transport at an angle relative to the direction of advance of the workpiece panel. A sliding carriage, having a plurality of suction cups disposed upon the underside of a vertically reciprocating press beam, is used to transport the panel sections.

3 Claims, 4 Drawing Sheets

METHOD FOR TRANSPORTING AWAY PANEL SECTIONS CUT OFF A WORKPIECE PANEL ALONG A CUTTING PLANE IN A PANEL SAW

BACKGROUND OF THE INVENTION

The present invention relates in general to machining and manufacturing lines and in particular to a method and apparatus for transporting panel sections away from a panel saw to enable the facilitated, high-speed sychronized advance of workpiece panels to the panel saw.

In a manufacturing line, where sections of material are cut from larger stock pieces, as, for example, where panel sections are cut from a workpiece panel by a panel saw, a problem arises in that the cut sections must be removed from the vicinity of the saw blade, in order to prevent "piling up" of the cut panel sections, which would impede the advance of the workpiece panel. Advance of the workpiece panel, and the overall rate of producing cut panel sections, are therefore necessarily limited by the rate at which the cut panel sections are removed. One known method of removing panel sections is as follows. After each cut has been made, panel sections severed from a workpiece panel are raised behind the panel saw to such an extent that immediately afterwards the workpiece panel can be repositioned at a high advancing speed in the direction of advance in the panel saw and clamped in position to enable a panel section to be cut off. Meanwhile, the panel section which, has been previously cut off and raised, is transported further on in the direction of advance and then lowered for transferral to a conveying device following the panel saw.

Transportation of single panel sections from the panel saw to the conveying device in the direction of advance involves a relatively large space requirement behind the panel saw. It is particularly disadvantageous that the transporting device for transporting single panel sections must cover a relatively large idle path in the direction opposite the direction of advance after a panel section has been deposited, as this excludes the possibility of coordinating the transportation of panel sections with the cutting off of panel sections which would achieve clocked synchronization of the severing of the panels and the transporting away of panel sections in the best possible time sequence.

An object of the present invention is, therefore, to so improve a method wherein a panel section is raised above the plane of support of a workpiece panel after being cut therefrom, transported parallel to the plane of support and perpendicularly to the cutting plane of the panel saw to a conveying means, such that substantially less space behind the panel saw and considerably less transportation time are required to transport single panel sections to the conveying device, thereby enabling continuous operation of the panel saw at high advancing speeds.

This and other objects of the invention will become apparent in light of the present specification and drawings.

SUMMARY OF THE INVENTION

In accordance with the inventive method, panel sections severed from the workpiece panel are raised and then transported away towards the conveying device transversely to the direction of advance of the workpiece panel so as to come to rest on the conveying device alongside the workpiece panel which has meanwhile undergone readjustment in the panel saw. In order to avoid the clamping range of the panel saw, the cut panel sections are deposited in offset relation to the direction of advance and to the workpiece panel.

The transportation motion being oriented transversely to the direction of advance of the workpiece panel, shortens the transportation time of the panel sections to such an extent that the take-over from the panel saw can be optimally synchronized with the advance of the workpiece panel with respect to time.

Furthermore, the space required behind the panel saw to carry away the panel sections can be limited to a minimum.

Transportation of the panel sections in accordance with the present invention can be carried out with an apparatus comprising a transporting device in the form of a compound slide, with one slide being displaced in the direction of advance and the other slide transversely to the direction of advance, in which case, it is expedient for these slide motions to be carried out jointly. In a preferred embodiment of the invention, the panel sections are transported towards the conveying device at an angle of 45 degrees to the direction of advance.

In a preferred embodiment of the invention, the lifting unit, equipped with suction members, is displaceable by a crank drive which imparts to the lifting unit a transporting speed which first accelerates and then slows down again as it approaches the conveying device.

DETAILED DESCRIPTION OF THE DRAWINGS

Figure 1:
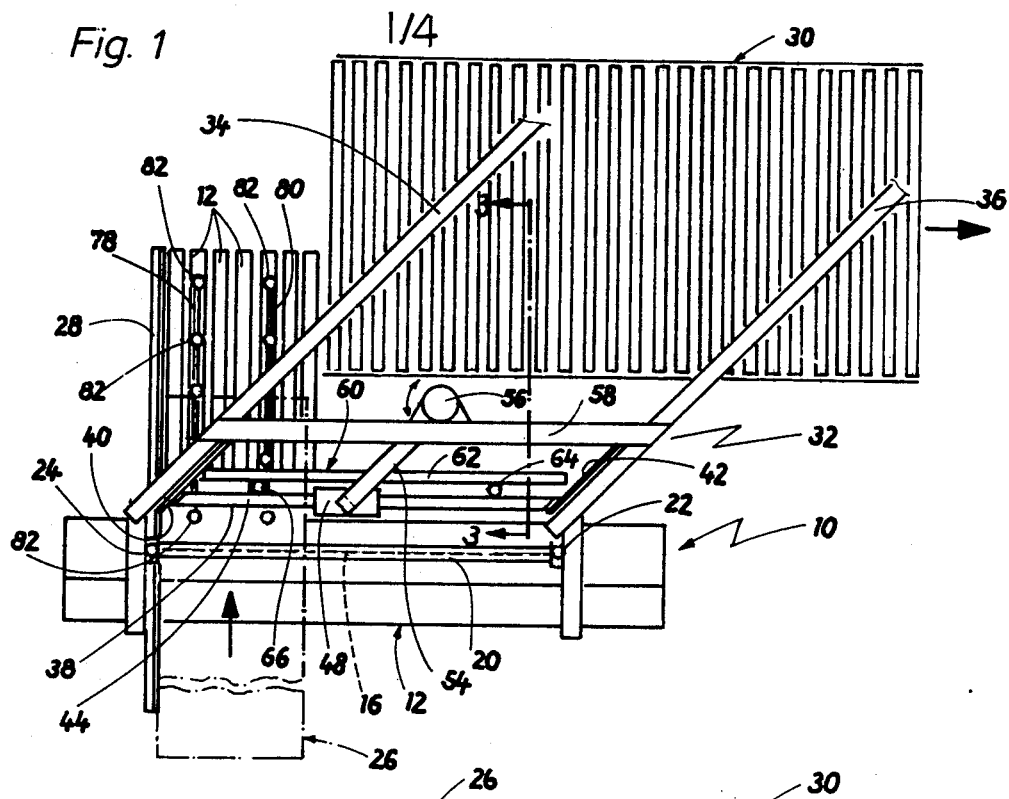
FIG. 1 is a plan view of a panel saw with associated apparatus in a first embodiment, in which its transporting device is shown in its take-over position for transporting a panel section onto a conveying device associated with the panel saw.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Figure 2:
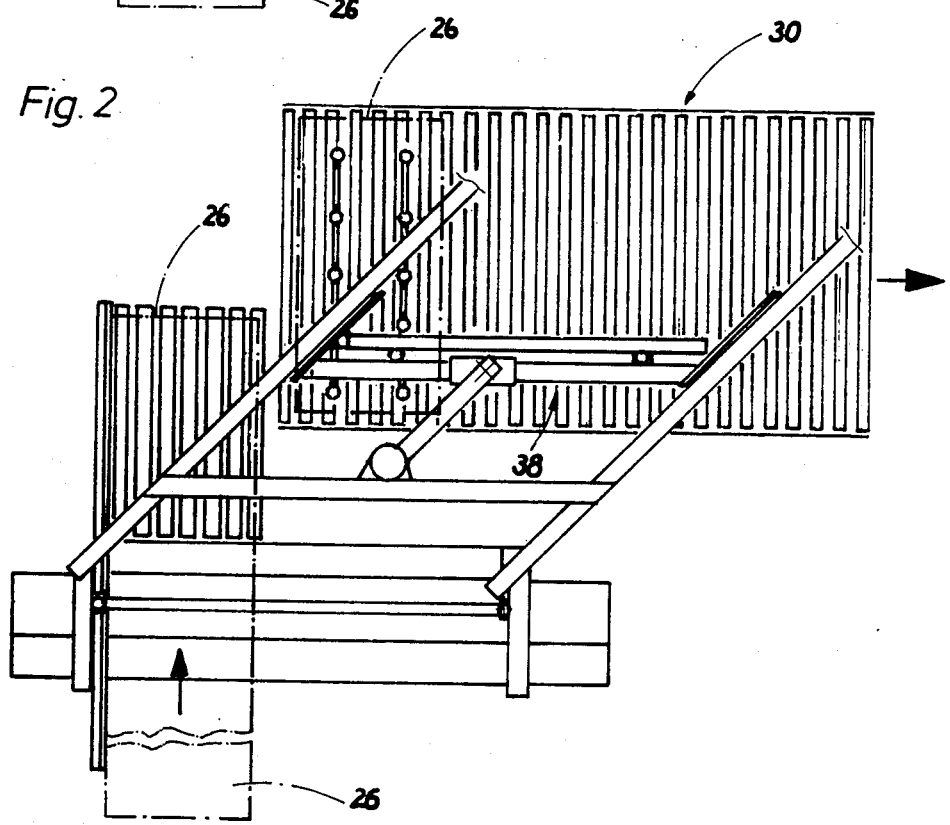
FIG. 2 is an illustration similar to FIG. 1 in which the transporting device is shown in its delivery position.
Figure 3:
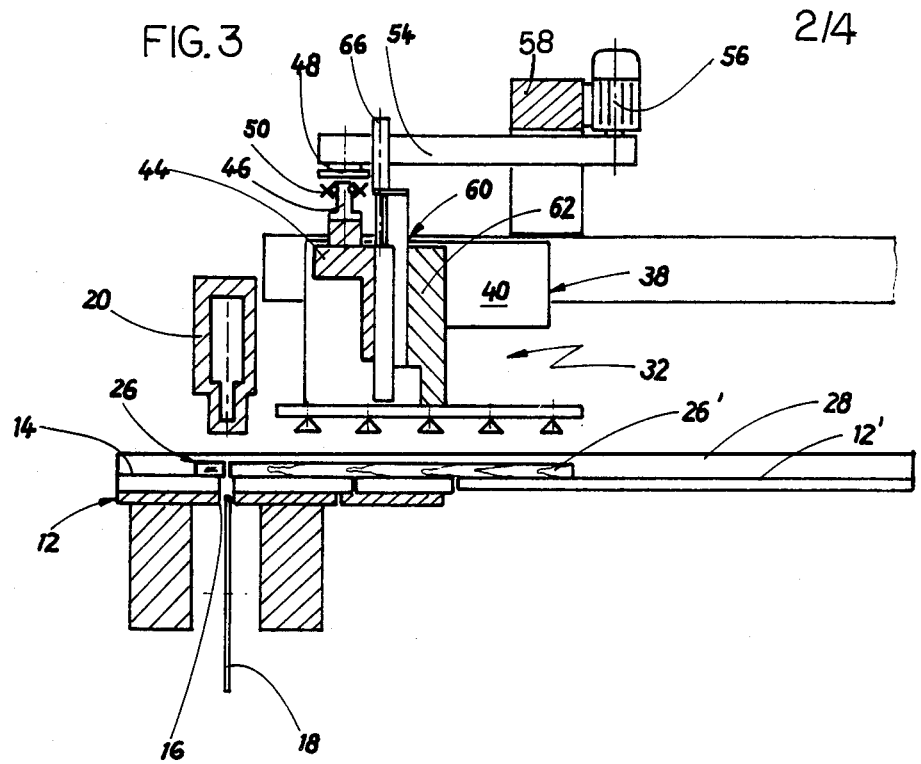
FIG. 3 is a partial sectional view through the apparatus along line 3—3 of FIG. 1 in which the lifting unit of the transporting device is shown in its initial raised position.
Figure 4:
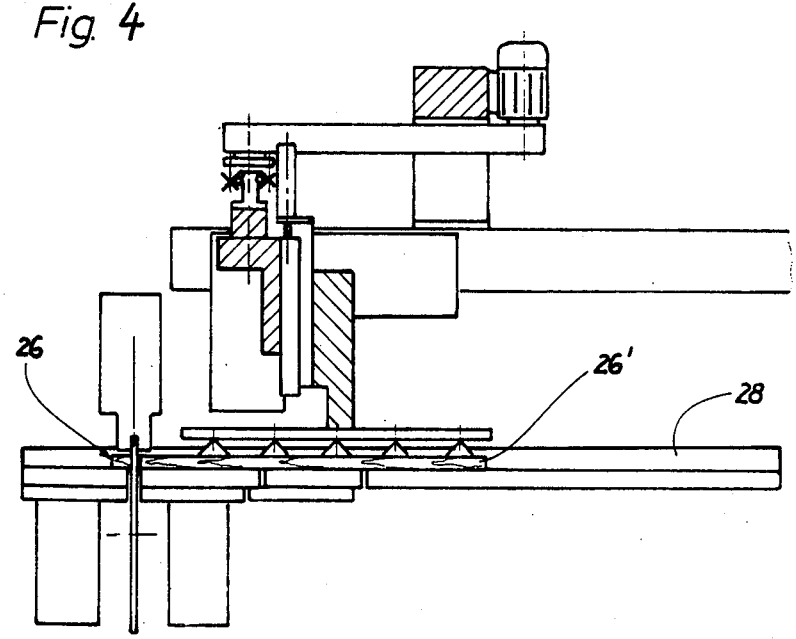
FIG. 4 is an illustration similar to FIG. 3 in which the lifting unit has been lowered onto a panel section into its take-over position.

A panel saw, known in the art, is designated in its entirety by reference number 10, as seen in FIGS. 1 and 2. Panel saw 10 comprises a workpiece support table 12 with a horizontal plane of support 14. Extending along the workpiece support table 12 is a saw slit 16 with an associated saw unit which is displaceably arranged beneath the workpiece support table 12 and of which only a circular saw blade 18 is shown in FIGS. 3 and 4. Provided above the saw slit 16 is a press beam 20 extending over the entire length of the slit. By means of upright work cylinders 22 and 24, which engage the ends of press beam 20, and which are supported on the workpiece support table 12, the press beam 20 is lowerable from an upper released position (FIG. 3) into a lower clamping position (FIG. 4), to clamp onto the workpiece support table a workpiece panel 26 which is to be split up by the panel saw 10, and is raisable again into the released position to release the workpiece panel. The workpiece support table 12 comprises a table extension 12' at the rear side of the panel saw 10. Reference number 28 designates a lateral stop, shown in FIGS. 1, 3, and 4, which is provided on the workpiece support table 12 and extends in the direction of advance of the workpiece panel. The workpiece panel 26, which is to be transported stepwise into the panel saw 10 by an advancing device, not illustrated, can be aligned at right angles to the saw slit 16 along this lateral stop 28. After a panel section 26' has been cut off, the workpiece panel 26 is advanced at a high advancing speed of, for example, 60 to 80 m/min by the above-mentioned advancing device and is fixed on the workpiece support table by the press beam 20 to enable a further panel section 26' to be cut off.

Each cut made by the circular saw blade 18 produces a panel section 26' which, after release by the press beam 20, must be carried away to a conveying device 30 following the panel saw 10, because the workpiece panel is advanced by the workpiece support table 12, 12' immediately afterwards. This is carried out by a transporting device 32 associated with the panel saw 10 on its output side and arranged above the place of support 14 of the workpiece support table 12, 12'. The transporting device 32 is so designed that before the workpiece panel 26 is advanced again at a high advancing speed, a severed panel section 26' is raised from the plane of support 14 (FIG. 3) parallel to it by such an amount that the workpiece panel 26 can be advanced underneath the panel section 26'. During this advancing motion, the panel section 26' is simultaneously moved away by the transporting device 32 in the direction of the conveying device 30 so that on reaching conveying device 30, panel section 26' comes to rest with part of it lying alongside the workpiece panel 26, which has been advanced into a new cutting position (see FIG. 2). Accordingly, the panel section 26', which is to be transported further on, is carried away at an incline to the direction of advance of the workpiece panel 26, which enables the conveying device 30 to be moved up very close to the panel saw 10. In this way, the space requirement for accommodation of the transporting device 32 and conveying device 30 can be limited to a minimum.

The transporting device 32 comprises, for transportation of the panel section 26', a transportation slide 38, which is displaceable along two parallel guide rails 34 and 36. It is guided between the guide rails 34 and 36 along these by lateral slide carriages 40 and 42. The transportation slide 38 comprises a slide crosspiece 44, which is held at its ends on the slide carriages 40 and 42. To enable slide transportation, the slide crosspiece 44 comprises, on its upper side, an upright driver section 46 on which a driver slide 48 is arranged for displacement in the longitudinal direction of the driver section 46.

This is enabled by, for example, guide rollers 50, mounted for rotation on the driver slide 48 so as to laterally overlap the driver section 46 and roll on structural shapes 52 of, for example, circular cross-section attached to the driver section. Viewed perpendicularly to the drawing plane, in accordance with FIG. 5, two guide rollers 50 are preferably arranged on the driver slide 48 in laterally spaced relation to one another on each side of the driver section 46.

Figure 5:
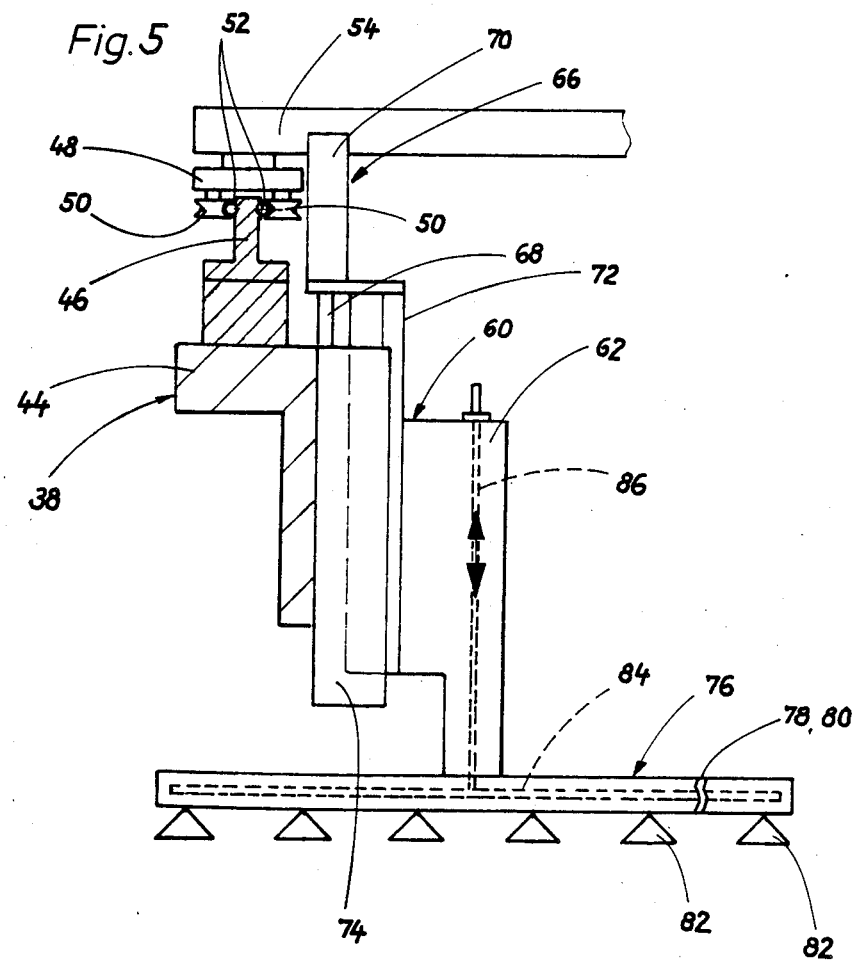
FIG. 5 shows an enlarged detailed view of a portion of the invention according to FIG. 4.
Figure 6:
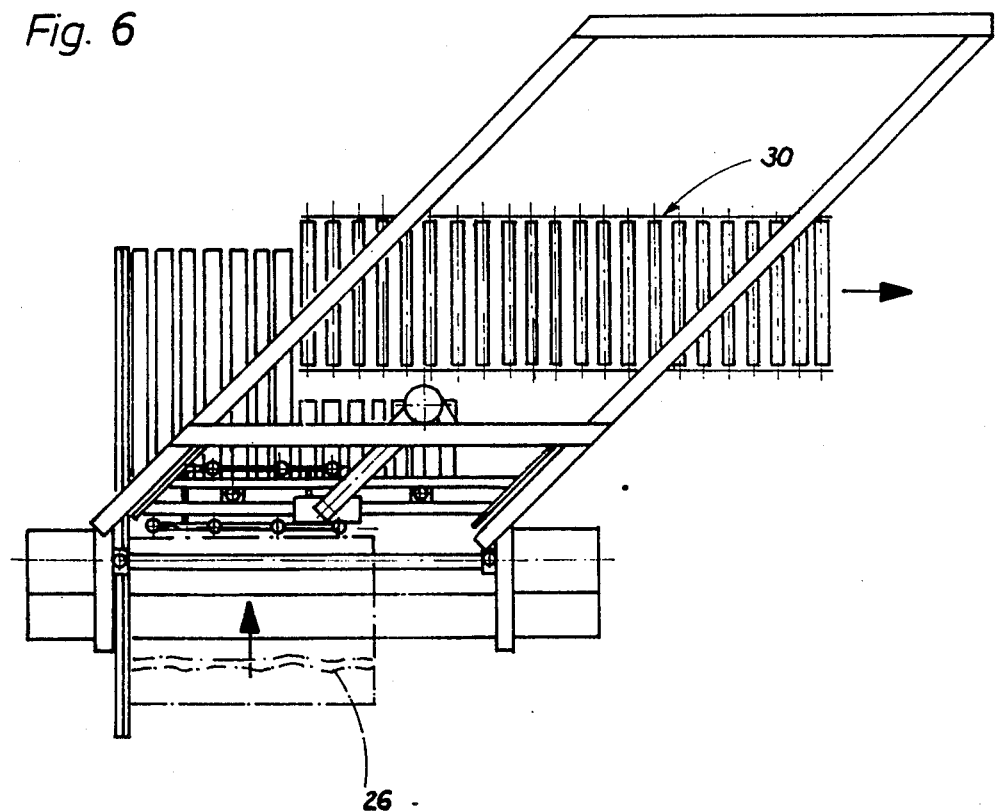
FIG. 6 is a plan view of a panel saw with associated apparatus, in a second embodiment, in which its transporting device is shown in its take-over position.
Figure 7:
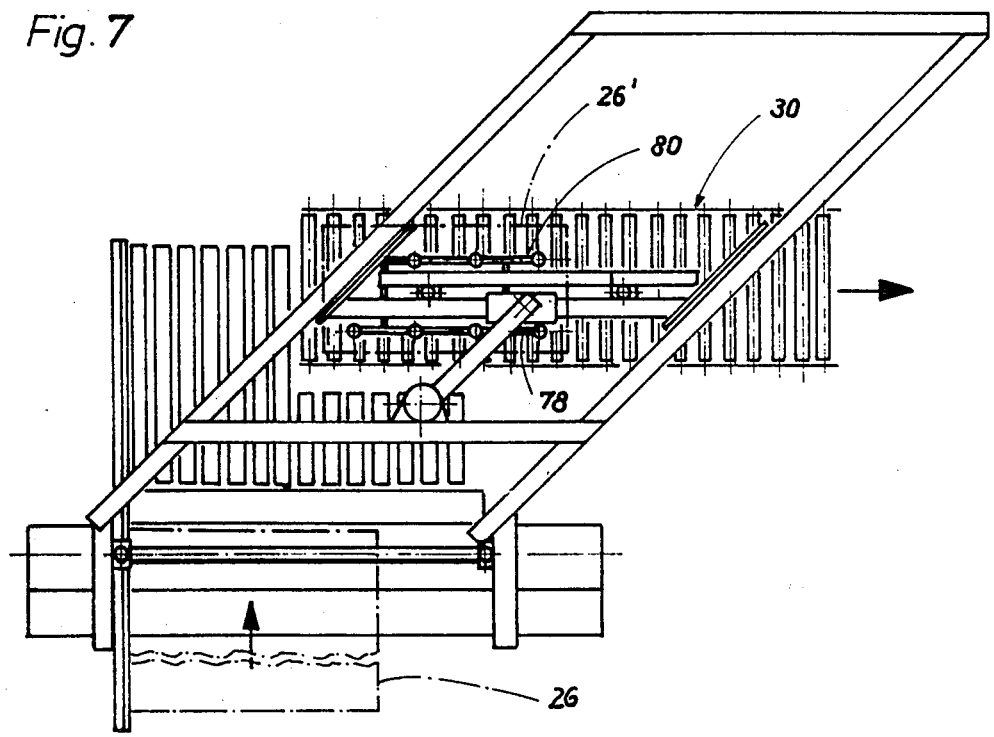
FIG. 7 is an illustration similar to FIG. 6 in which the transporting device is shown in its delivery position.

The driver slide 48 is arranged for swivel motion on the underside of a crank arm 54 which overlaps, with its end portion, the driver section 46. The crank arm can be swivelled through 180 degrees of rotation, as seen in FIGS. 1 and 2, by a gear motor 56 and is seated on a traverse member 58 resting on the guide rails 34 and 36 and rigidly connected thereto. The slide crosspiece 44 carries on its longitudinal side facing the conveying device 30, a lifting unit designated in its entirety by reference number 60, by means of which panel sections 26' can be raised from the plane of support 14 of the workpiece support table 12 and lowered on the conveying device 30. The lifting unit 60 is comprised of a rail-type carrier 62 extending parallel to the slide crosspiece 44 and a pair of lifting cylinders 64 and 66 which are supported on the slide crosspiece 44 by, for example, piston rod 68 (FIG. 5). Attached to cylinder part 70 is a guide element 72, which is held on the carrier 62 and guided for vertical displacement in a guide bed 74 of the slide crosspiece 44. When a pressure medium, for example, air, is introduced into the cylinder part 70 of the lifting cylinders 64, 66, cylinder par 70 is driven downwardly or solely upwardly relative to a piston seated on the piston rod 68, whereby the carrier 62 is moved vertically downwardly and/or upwardly relative to the slide crosspiece 44. Seated on the underside of the rail-type carrier 62 is a suction head designated in its entirety by reference numeral 76. The suction head carries, for example, two laterally spaced carrier bars 78, 80 provided with a plurality of suction members 82 on their respective undersides. In relation to the longitudinal extension of the panel sections 26', which are to be cut off the workpiece panel 26, the two carrier bars 78, 80 are arranged so as to extend parallel to the longitudinal center plane of the panel sections 26'. In accordance with FIGS. 1 and 2, the carrier bars 78, 80 extend in the direction of advance since the workpiece panel 26 which is to be split up is relatively narrow, whereas in the construction shown in FIGS. 6 and 7, carrier bars 78, 80 extend transversely to the direction of advance because, in this embodiment, the workpiece panel 26 which is to be split up is relatively broad.

The individual suction members 82 are connected to a suction channel 84 which extends in the carrier bars 78, 80 and can be connected by way of a connection channel 86 arranged in the rail-type carrier 62 to a pressure source (not shown) to generate a negative pressure.

The inventive apparatus operates as follows:

Assuming as shown in FIG. 1, that the transporting device 32 is in its take-over position (FIGS. 1 and 3) in which a workpiece panel 26 is inserted at a relatively high advancing speed into the panel saw 10 to establish position for the first cut. After insertion, press beam 20 and lifting unit 60 are lowered in the direction of the workpiece panel 26 and the suction members 82 of the lifting unit 60 adhere to the upper side of the workpiece panel 26 by suction. Once the cut has been made to sever a first panel section 26', the press beam 20 is driven up again into its released position. Immediately after release of workpiece panel 26 and panel section 26', the lifting unit 60 of the transporting device 32 is driven in the upward direction and the panel section 26' is thereby raised from the plane of support 14 to such an extent that a further advancing motion can be imparted at a high speed to the workpiece panel 26 immediately afterwards. This advance is carried out at a point in time when the panel section 26' is still mainly located above the workpiece panel 26, and during the transporting motion of the transporting device 32 along the guide rails 34, 36, the press beam 20 drops into its clamping position again and a further cut is made. The crank arm 54 which brings about the transporting motion of the transporting device 32 executes a 180 degree swivel motion, as shown in FIGS. 1 and 2, with the transporting device 32 being accelerated in the initial phase of the transporting motion and slowed down to a stop towards the end of the transporting motion. The transporting motion occurs in coordination with the advancing motion of the workpiece panel 26 and the cutting at such a speed that after each cut has be made, the respective panel section 26' is immediately raised from the plane of support 14 to make way for the next advance of the workpiece panel 26.

As is apparent from FIG. 2, due to the inclined orientation of the transporting device 32 in relation to the direction of advance of the workpiece panel 26, the panel section 26', relative to its lift-off position on the workpiece support table 12, 12', is so deposited on the conveying device 30 in offset relation to the direction of advance that it lies with part of its length alongside the workpiece support table 12, 12'. The inventive apparatus, therefore, enables panel sections 26' to be transported away rapidly with only a very short transportation path being covered. Also, relatively little space is required for the apparatus and the conveying device 30 behind the panel saw 10.

the foregoing description and drawings merely explain and illustrate the invention and the invention is not limited thereto insofar as the appended claims are so limited, as those skilled in the art who have the disclosure before them will be able to make modifications and variations therein without departing from the scope of the invention.

What is claimed is:

1. A method, in a panel saw, for transporting away at least one panel section which has been cut off a workpiece panel positioned upon a plane of support and along a cutting plane of said saw at a first machining position thereon, said method comprising the steps of:

raising said panel section above said plane of support after a cut has been made to said workpiece panel;

transporting said panel section along a direction parallel to said plane of support and perpendicular to said cutting plane to a conveying device at a desired speed;

advancing said workpiece panel along a direction of advance to a new machining position relative to said panel saw at an advancing speed greater than said speed at which said panel section is transported to said conveying device;

fixing said workpiece panel in a new cutting position relative to said saw cutting plane, and depositing said panel section on said conveying device in laterally offset relation with respect to said workpiece panel and in offset relation to said direction of advance.

2. The method according to claim 1 and further comprising the step of:

transporting away said panel section, after being deposited on said conveying device, in the direction of said cutting plane.

3. The method according to claim 1 wherein said step of raising said at least one panel section above said plane of support is accomplished by suction means operably associated with said panel saw.

* * * * *

UNITED STATES PATENT AND TRADEMARK OFFICE
CERTIFICATE OF CORRECTION

PATENT NO. : 4,879,931
DATED : November 14, 1989
INVENTOR(S) : Erwin Jenkner

It is certified that error appears in the above-identified patent and that said Letters Patent is hereby corrected as shown below:

The reference numeral 12 in the upper left quarter of FIG. 1 is changed to -- 12' --.

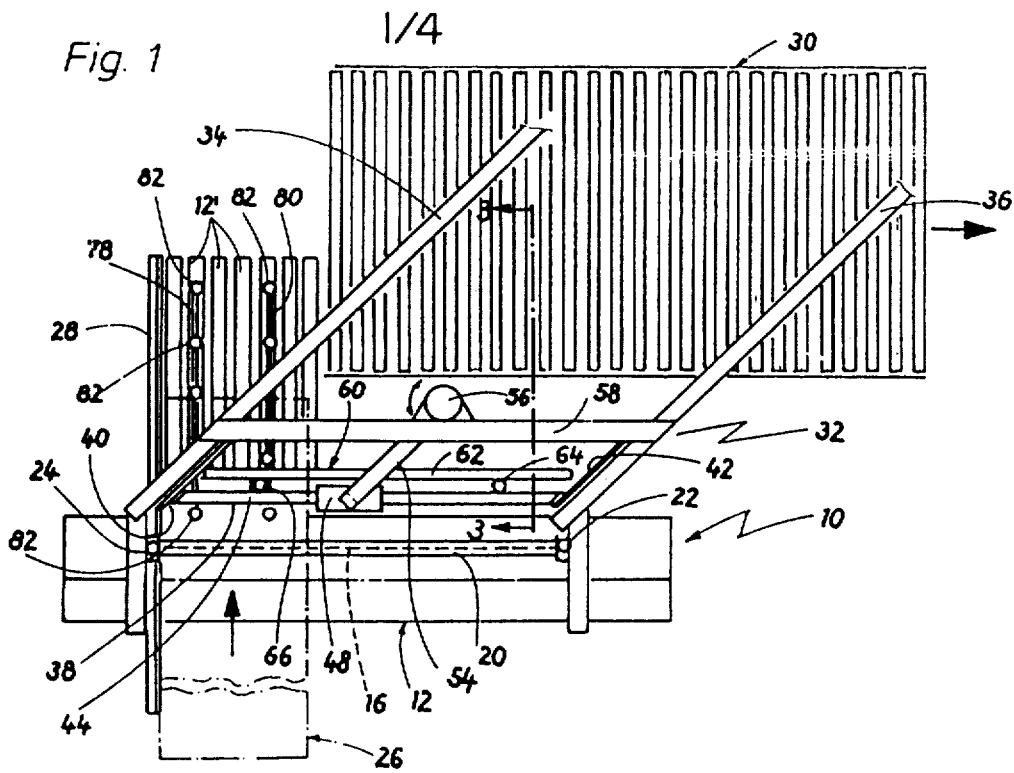

UNITED STATES PATENT AND TRADEMARK OFFICE
CERTIFICATE OF CORRECTION

PATENT NO. : 4,879,931

DATED : November 14, 1989

INVENTOR(S) : Erwin Jenkner

It is certified that error appears in the above-identified patent and that said Letters Patent is hereby corrected as shown below:

Col. 2, line 35        After "apparatus", insert --,--.

Col. 4, line 31        After "cylinder", delete "par" and insert instead -- part --.

UNITED STATES PATENT AND TRADEMARK OFFICE
CERTIFICATE OF CORRECTION

PATENT NO. : 4,879,931

DATED : November 14, 1989

INVENTOR(S) : Erwin Jenkner

It is certified that error appears in the above-identified patent and that said Letters Patent is hereby corrected as shown below:

Col. 2, line 52        After "position" delete ","
and insert instead -- ; --.

Col. 5, line 21        Delete "be" and insert instead -- been --.

Signed and Sealed this

Twenty-fifth Day of February, 1992

Attest:

HARRY F. MANBECK, JR.

*Attesting Officer*    *Commissioner of Patents and Trademarks*